UNITED STATES PATENT OFFICE.

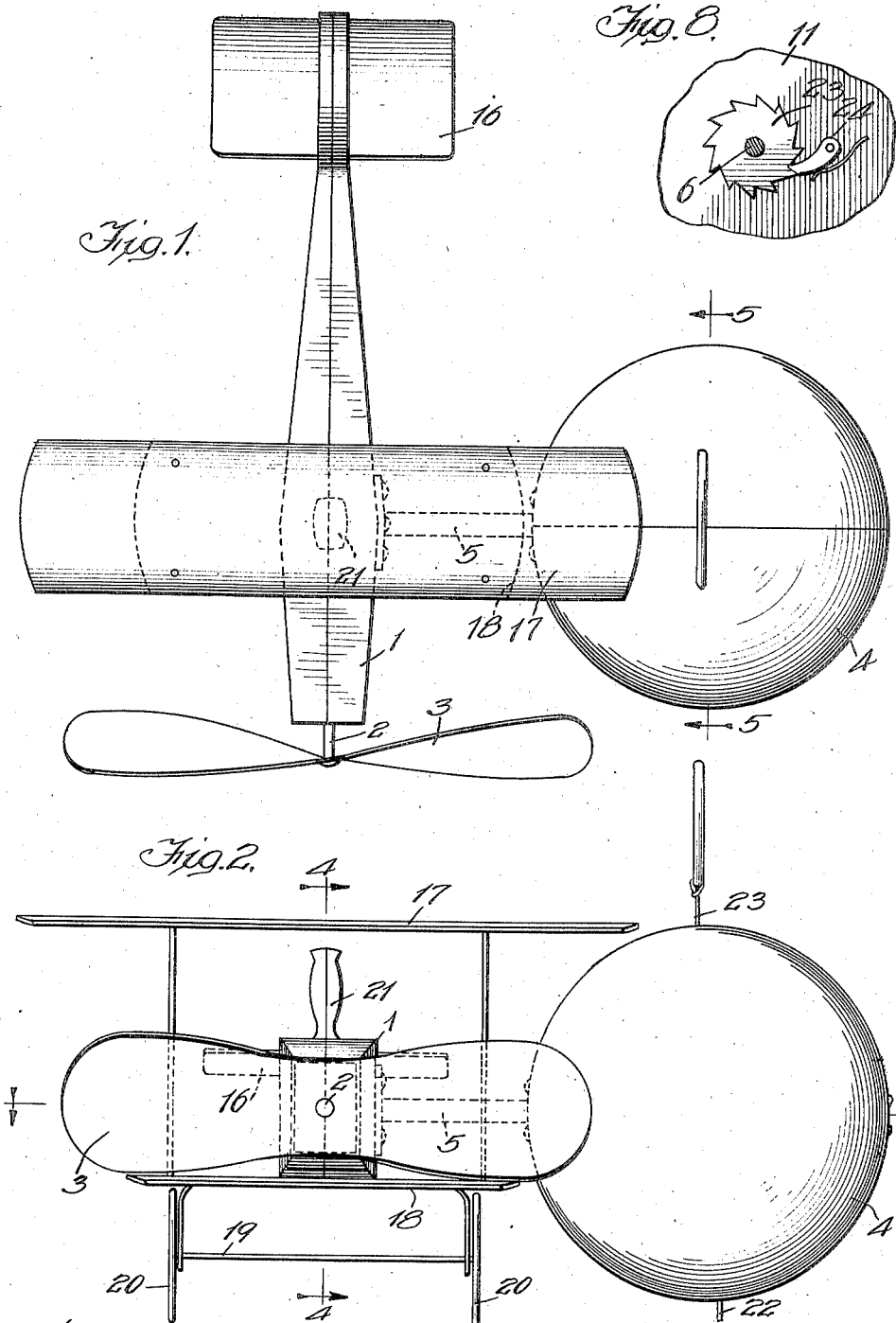

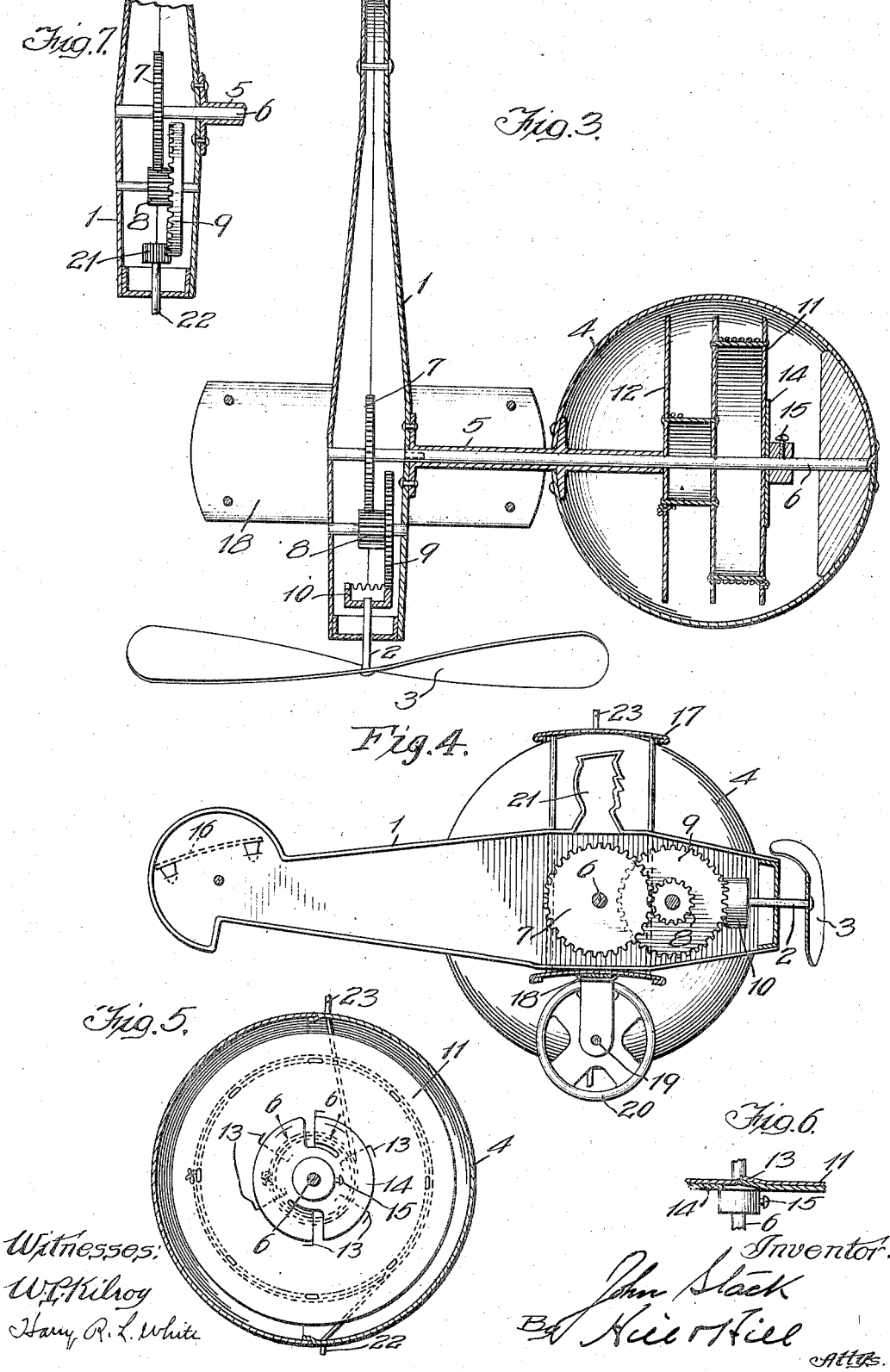

JOHN STACK, OF CHICAGO, ILLINOIS.

TOY.

1,308,124.　　　Specification of Letters Patent.　　Patented July 1, 1919.

Application filed August 19, 1918. Serial No. 250,527.

*To all whom it may concern:*

Be it known that I, JOHN STACK, a citizen of the United States, residing at Chicago, in the county of Cook and State of Illinois, have invented certain new and useful Improvements in Toys, of which the following is a description.

My invention belongs to that general class of toys which are actuated by the manual pulling upon a cord or cords or similar parts, serving to put the device in motion. It has for its object the production of a toy, preferably closely imitating an aeroplane, which, as it is actuated by drawing upon the cord, closely imitates certain movements of the said device. It consists of the novel construction, arrangement and combination of parts shown and described and more particularly pointed out in the claims.

In the drawings wherein like characters indicate like or corresponding parts,

Figure 1 is a top plan view of the device,

Fig. 2 is a front elevation,

Fig. 3 is a transverse section on line 3—3 of Fig. 2,

Fig. 4 is a vertical section on line 4—4 of Fig. 2,

Fig. 5 is a section in line 5—5 of Fig. 1,

Fig. 6 is a fragmentary detail view,

Fig. 7 is a partial sectional view corresponding to Fig. 3 showing a modification, and Fig. 8 is a modification of the ratchet connection for the spool.

In the drawings illustrating the preferred form of construction, 1 represents the body representing the body of an aeroplane within which a part of the mechanism is positioned which actuates the shaft 2 upon which is mounted the propeller 3. A suitable receptacle for a portion of the mechanism, preferably spherical in form, is indicated at 4 which is firmly connected to the part 1 by means of a sleeve 5. There is a shaft extending from the receptacle 4 through the sleeve 5 and carrying upon its end a pinion 7 within the body 1. The pinion 7 meshes with a small pinion 8 connected to a larger pinion 9 which in its turn meshes with a cup pinion 10 to which the shaft 2 is secured. A double spool 11—12 is loosely mounted upon the shaft 6. A cord or equivalent 22 is wound upon the spool 11, with its free end extended downward through the part 4. A similar cord 23 is wound upon the spool 12 with the free end extending through the top of the part 4 and being wound in the opposite direction tends to rotate the spool in the opposite direction from that in which it is rotated when the downwardly extending cord is pulled upon.

Upon the outer face of the spool 11 a series of concentric slots or steps is formed to constitute a ratchet member as at 13, Figs. 5 and 6, which coöperate with a spring pawl 14 secured to the shaft 6 in any preferred manner, as for illustration, by a set screw 15 shown in Figs. 3–5 and 6. 16 represents the tail or guiding fin of the areoplane and 17—18 the planes thereof. 19 represents the shaft for the wheels 20. 21 represents the aviator in his place.

22, Fig. 2, represents the downward extending cord and 23 the upwardly extending cord by means of which the device is operated.

The whole device is carefully counterbalanced so that when it is suspended by the upper cord 23, the areoplane will stand in proper, horizontal position, supporting the device by the upper cord and drawing forcibly upon the lower cord; the spool 11 engages with the pawl 14 and as the pull continues the cord upon the similar spool is wound thereon, the device gradually mounting upward by this action and a rotation being given to the shaft 6 which is transmitted as described to the propeller 3. If the pull is gradual the device will mount regularly upward. If the pull is more forcible, however, the action of the propeller will cause the device to turn about the upper cord as a center, the device moving forward or toward the propeller end.

Upon ceasing the pull on the lower cord, the pawl will release from the ratchet, and the spool will loosely rotate in the reverse direction on the shaft 5, letting the device gradually descend, when the operation may be repeated.

As shown in Fig. 7, the pinion is provided with cog teeth on its face, coöperating with the teeth on the straight pinion 21, on the propeller shaft 22. The operation is the same.

In Fig. 8 a ratchet 23 is shown mounted on the actuating shaft 6, while a coöperating spring pawl 24 is carried on the face of the spool 11. The operation is substantially the same.

The toy is a very attractive one for children, economical in its construction and reasonably durable in use.

What I claim as new and desire to secure by Letters Patent is:—

1. In a device of the kind described, a rotatable shaft, a spool loosely mounted on the shaft, cords oppositely wound upon the spool and extending in opposite directions therefrom, in combination with a ratchet member carried by one of said parts and a coöperating pawl by the other, whereby upon drawing upon one of the cords the spool and shaft will be rotated together, and upon drawing on the other cord the spool will be loosely rotated on the shaft in a reverse direction.

2. In a device of the kind described, a rotatable shaft, a double spool loosely mounted on the shaft, cords oppositely wound upon the spool and extending in opposite directions therefrom, in combination with a ratchet member carried by one of said parts and a coöperating pawl by the other, whereby and upon drawing upon one of the cords the spool and shaft will be rotated together and upon drawing on the other cord the spool will be loosely rotated on the shaft in a reverse direction.

3. In a device of the kind described, a rotatable shaft, a double spool loosely mounted on the shaft, cords oppositely wound upon the spool and extending in opposite directions therefrom, a ratchet member carried by one of said parts and a coöperating pawl by the other, in combination with a propeller shaft, and intermediate mechanism between the first named shaft and the propeller shaft.

4. In a device of the kind described, a casing, a rotatable shaft supported in the casing, a spool loosely mounted on the shaft, cords oppositely wound upon the spool and extending in opposite directions therefrom, a ratchet member carried by one of said parts and a coöperating pawl by the other, a sleeve member outwardly extending from the casing within which the rotatable shaft is located, in combination with a miniature areoplane, attached to the outer end of the sleeve, a propeller shaft carried by the areoplane and intermediate mechanism between the first named shaft and the propeller shaft.

5. In a device of the kind described, a casing, a rotatable shaft supported in the casing, a double spool mounted on the shaft, one section of the spool being larger than the other, cords oppositely wound upon the sections of the spool and extending in opposite directions therefrom, a ratchet member carried by one of said parts and a coöperating sleeve outwardly extending from the casing within which the shaft is positioned and a pinion mounted on the outer end of the shaft, in combination with a miniature areoplane secured to the outer end of the sleeve within which the pinion is positioned, a propeller shaft carried by the areoplane, and intermediate mechanism between the pinion and the propeller shaft.

In testimony whereof, I have hereunto signed my name in the presence of two subscribing witnesses.

JOHN STACK.

Witnesses:
JOHN W. HILL,
CHARLES I. COBB.